United States Patent [19]

Cameron

[11] Patent Number: 4,655,438
[45] Date of Patent: Apr. 7, 1987

[54] HYDRAULICALLY DAMPED DUAL SLEEVE AIR SPRING SUSPENSION

[75] Inventor: David S. Cameron, Grosse Pointe Woods, Mich.

[73] Assignee: General Motors Corporation, Detroit, Mich.

[21] Appl. No.: 812,835

[22] Filed: Dec. 23, 1985

[51] Int. Cl.[4] ............................................. F16F 9/04
[52] U.S. Cl. ................................. 267/8 R; 267/64.21; 267/64.24
[58] Field of Search ................. 267/8 R, 64.19, 64.21, 267/64.23, 64.24, 64.25, 64.27, 118, 121, 122, 152; 74/18.2; 92/35, 37, 39, 98 D; 280/711

[56] References Cited

U.S. PATENT DOCUMENTS

| | | | |
|---|---|---|---|
| 3,042,392 | 7/1962 | Schmitz et al. | 267/64.21 X |
| 3,135,524 | 6/1964 | Jackson et al. | 280/6.1 |
| 3,653,651 | 4/1972 | Allinquant et al. | 267/64.24 |
| 3,700,225 | 10/1972 | Fader et al. | 267/64.24 X |
| 4,022,448 | 5/1977 | Reeder | 267/8 R |
| 4,531,759 | 7/1985 | Rezanka et al. | 267/8 R X |

Primary Examiner—Andres Kashnikow
Assistant Examiner—Richard R. Diefendorf
Attorney, Agent, or Firm—Charles R. White

[57] ABSTRACT

A dual path rolling lobe air spring suspension strut with the inner rolling lobe air seal eliminating air pressurization of the strut to eliminate the strut mount as a leak path and so that the sealing of air within the air spring in the vicinity of the strut rod is eliminated so that the strut rod scraper lip and air pressurization of the strut valving is eliminated.

3 Claims, 4 Drawing Figures

HYDRAULICALLY DAMPED DUAL SLEEVE AIR SPRING SUSPENSION

This invention relates to air spring suspensions for vehicles and more particularly to a new and improved hydraulically damped dual sleeve air spring which minimizes air spring leak paths while eliminating air pressure preload of operating parts of the hydraulic damper used with the air spring.

Prior to the present invention, various hydraulic dampers, i.e. shock absorbers and suspension struts have been provided with air sleeves of flexible polymeric material usually with tension resisting reinforcement therein to provide an air suspension for a vehicle. In many advanced air spring suspension struts, the shock loads and the air spring loads are carried through separate paths provided by a dual rate upper mount mount operatively connecting the piston rod and the air spring to the mounting tower of the vehicle body work for improved vehicle handling and improved ride. More specifically, such dual path upper mounts include increased flexibility in vehicle turning and the flexibility to design a system with a relatively stiff spring suspension mount and a significantly softer shock mount. In these dual path designs, sealing of the upper portion of the pneumatic suspension spring with the mount and prevention of air pressurization of the strut rod scraper and strut valving have not met higher standards for sealing and involve complex and costly components.

The present invention obviates air sealing difficulties by using a special inner rolling lobe air sleeve in conjunction with an outer rolling lobe air sleeve to provide an optimally sealed rolling and variable volume air spring chamber to entrap pressurized suspension air. The preferred embodiments of this invention effectively isolate the pressurized suspension air from the upper mount and from the inner damper components of the strut or shock absorber. The inner and outer rolling lobe air sleeves accordingly eliminate the air pressurization of the strut mount so that it will not be a leak path and therefore system reliability will be increased.

This invention, accordingly, eliminates pressurized air from the under side of the strut mount to totally eliminate the strut mount as a sealing member from the air suspension spring. Furthermore, the present invention of a dual path design is improved by the sealing of the air within the two air sleeves in the vicinity of the strut rod and the upper seal and scraper lip of the damper which eliminates this location as a prime point for leaks in the system. This also provides protection for the upper seal and scraper lip thereof which could otherwise be deflected inwardly and against the piston rod to increase ride harshness as well as seal wear. Prior attempts to provide a sliding or rotary seal to accomplish the rod sealing in conventional single air sleeve designs have met with only limited success primarily due to mechanical wearing and eventual leakage of such seals.

These and other features, objects and advantages of this invention will become more apparent from the following detailed description and drawing in which.

Figure 1:
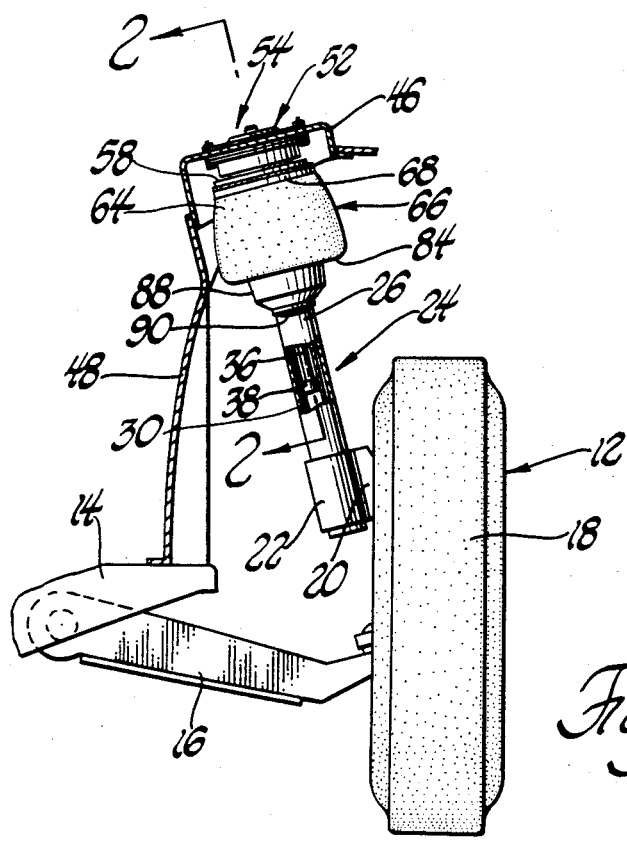
FIG. 1 is an elevational view with some parts in cross-section of an air spring suspension strut and steerable wheel assembly according to this invention.
Figure 2:
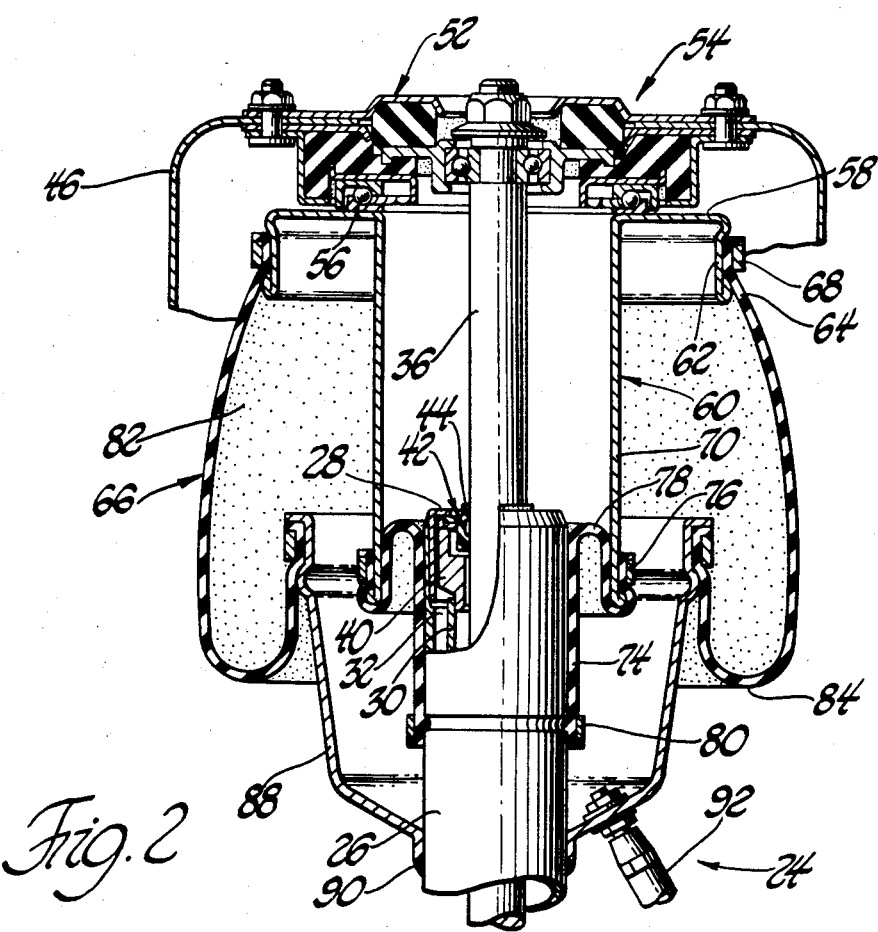
FIG. 2 is a view partly in cross-section taken along lines 2—2 of FIG. 1.

Turning now in greater detail to the drawing, there is shown in FIG. 1, a portion of a motor vehicle having a steerable front wheel assembly 12 connected to a vehicle frame 14 by a lower control arm 16. The wheel assembly includes a conventional dirigible road wheel 18 mounted on a wheel spindle and further includes a steering knuckle 20 having a cup-like mounting bracket 22 attached thereto. This mounting bracket 22 provides the lower support for a vehicle suspension strut 24 that has an outer cylindrical support tube 26 which closely fits in the lower bracket 22 and extends upwardly therefrom. The upper end of the support tube 26 is closed by an upper cap 28 which is welded or otherwise secured to the support tube which retains the shock absorber components thereto. The shock absorber comprises a reservoir tube which may be the outer support tube of this unit and has an inner cylinder tube 30 spaced therefrom to form a reservoir 32 for the shock absorber of this unit. The shock absorber contains a conventional base valve, not shown, disposed on the lower end of the cylinder tube to control flow of shock absorber oil between the oil-filled cylinder tube and the reservoir tube on compression and rebound stroke as is well known in this art. A cylindrical piston rod 36 extends axially upwardly from a conventional valved piston 38 slidably mounted in the cylinder tube 30 and through a rod guide 40 and upper seal assembly 42 that is mounted in the upper end of the cylinder tube immediately below upper cap 28. The seal assembly includes an annular elastomer body with annular scraper lip 44 which slidingly contacts the outer periphery of the shock absorber piston rod 36. The rod guide and seal assembly is retained in place by the inwardly turned end of the cap 28 as shown in FIG. 2. The piston rod 36 extends upwardly through an annular opening in a tower 46 formed in the vehicle body 48 and is secured to this body by a cover plate assembly 52 which provides an upper portion of a suspension mount 54.

The suspension mount 54 with elastomeric isolators corresponds to the dual path mount disclosed in U.S. Pat. No. 4,531,759 issued July 30, 1985 to Rezanka et al entitled "Suspension Struts For Vehicles With Onboard Service Shock Absorber Cartridge" assigned to the assignee of this invention and hereby incorporated by reference. Operatively disposed below the suspension mount 54 is an annular ball bearing unit 56, the lower race of which is in contact with the annular washer-like top 58 of an upper air sleeve carrier or retainer 60 preferably formed of sheet metal. This upper air sleeve retainer has an outer cylindrical flange 62 depending downwardly from the perimeter of the top to which the upper end 64 of a generally cylindrical outer rolling lobe air sleeve 66 is attached by clamp 68.

The upper or interior air sleeve retainer 60 has an inner tubular trunk 70 which extends downwardly from the top 58 and is generally concentric with the piston rod 36 that extends therethrough into connection with the upper mount as disclosed in the Rezanka et al patent, cited above. An inner rolling lobe air sleeve 74 is secured at its upper end to the outer cylindrical surface of the tubular trunk 70 of the inner piston by circular clamp 76. From clamp 76, the air sleeve extends downwardly and around the bottom edge of the tubular trunk to a reversely curved rolling lobe 78. From the rolling lobe, the air sleeve runs along the exterior of the support tube 26 into a terminal airtight connection with the support tube 26 by a clamp 80. The inner rolling lobe air sleeve 74 cooperates with the outer rolling lobe air sleeve 66 and other components to define an air spring pressure chamber 82 isolated from the upper mount and from the seal 42 so that air leakage is minimized and the upper seal of the strut and internal components such as the piston rod valving are not damaged by suspension spring pressure. This also prevents ride harshness from the seal 42 clamped between the rod guide and piston rod to inhibit piston rod stroke. The outer air sleeve 66 extends downwardly from clamp 68 to the annular rolling lobe 84 which reversely curves up along the upper periphery of a cup-shaped outer piston 88 which is welded at 90 to the support tube 26. Pressurized suspension air is supplied into this isolated chamber 82 through a conventional fitting 92. This fitting can be connected into any suitable supply of pressurized air such as disclosed in the Jackson et al U.S. Pat. No. 3,135,524 entitled "Control For Pneumatic Suspension System" or that described in U.S. patent application Ser. No. 685,806, filed Dec. 24, 1984 both assigned to the assignee of this invention and hereby incorporated by reference.

Figure 3:
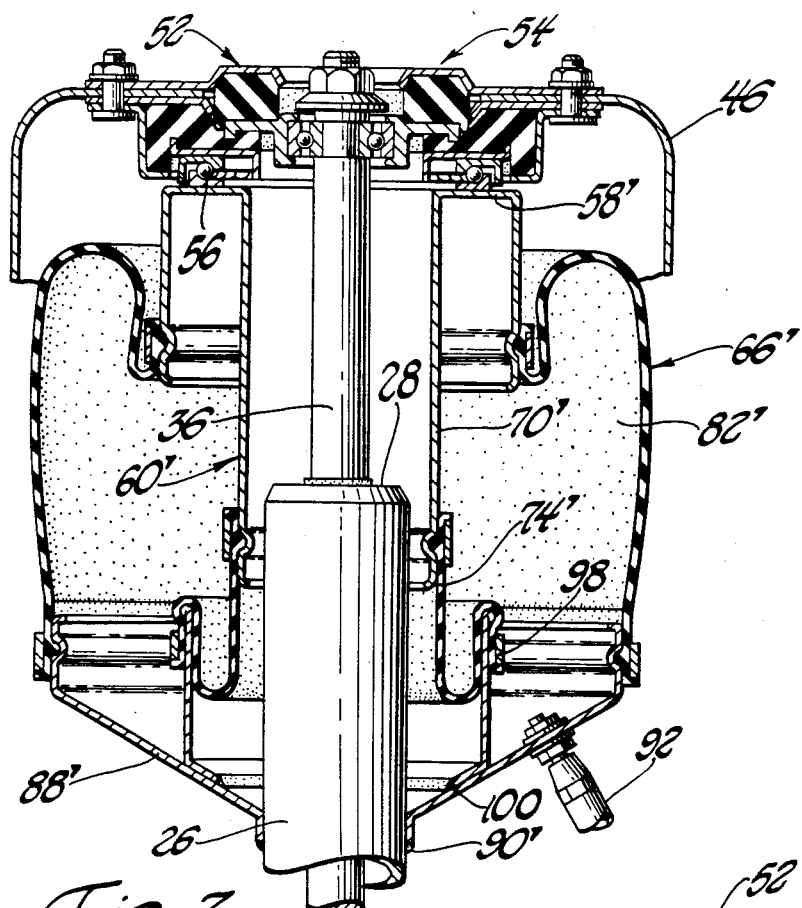
FIG. 3 is a view similar to the view of FIG. 2 illustrating a second embodiment of the invention.
Figure 4:
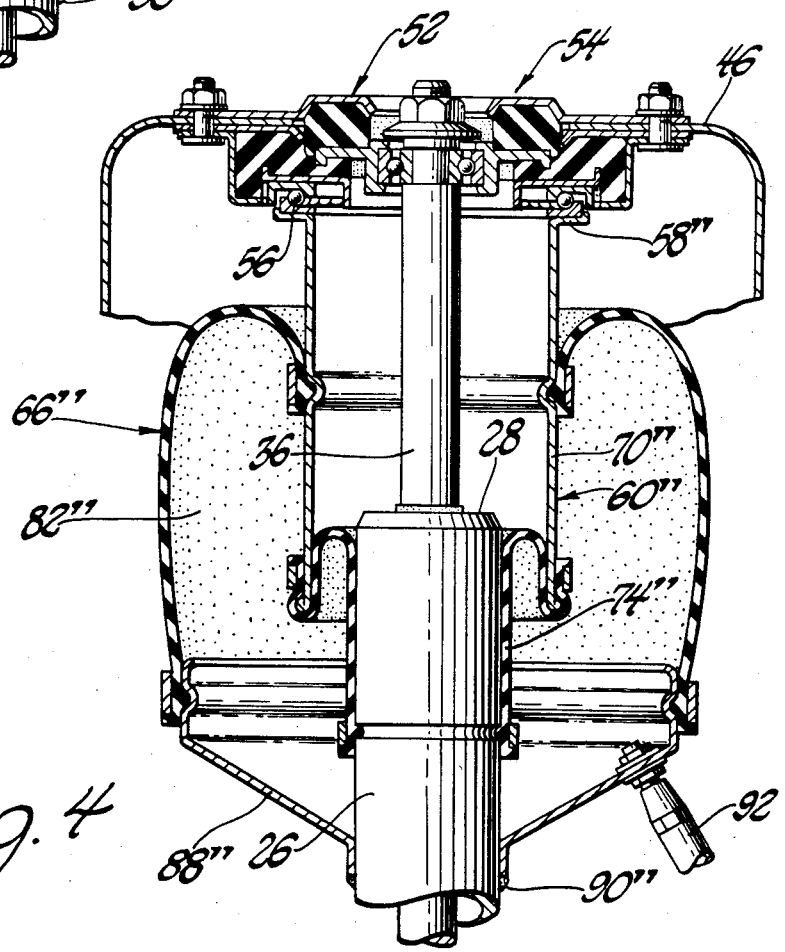
FIG. 4 is a view similar to the views of 2 and 3 showing a third embodiment of the invention.

FIG. 3 is a construction similar to FIG. 2, however, the outer rolling lobe air spring 66' is projecting upwardly and the inner rolling lobe air spring 74' projects downwardly. In this embodiment, lower end of the air spring 74' is connected by clamp 98 to the upper edge of an internal cylindrical support, the lower edge of which is welded at 100 to the inner surface of the outer air sleeve piston 88'. As in the FIG. 2 embodiment, pressurized suspension air is confined to the variable volume air suspension chamber and cannot pressurize the upper mount or the inner components of the strut. Accordingly, this invention eliminates these components as a source of pressure leaks. FIG. 4 is another preferred embodiment of the invention with the rolling lobes of air spring 66" and 74" directed upwardly. As in the previous embodiments, the FIG. 4 construction effectively prevents leakage of the air through the upper mount and prevents pressurization of the internal components of the strut. Accordingly, with this and the other embodiments of the invention, the inner air sleeve functions as a seal for the air spring thereby eliminating strut rod air seals proposed for the two path system and eliminates the upper strut mount as a source of air leaks.

While preferred embodiments of the invention has been shown and described to illustrate the invention, other modifications will now become more apparent to those skilled in the art. Accordingly, the scope of this invention is set forth in the following claims.

The embodiments of the invention in which an exclusive property or privilege is claimed are defined as follows:

1. A suspension strut for operatively mounting a road wheel assembly to a vehicle body and for pneumatically suspending the body with respect to the road wheel assembly comprising an elongated support tube having one end connected to said road wheel assembly and extending upwardly therefrom, shock absorber means operatively mounted in said support tube including an oil-filled cylinder tube mounted therein, a piston mounted for reciprocal movement in said cylinder tube and having a piston rod extending upwardly therefrom, an upper piston rod sealing member supported by said cylinder tube which slidably contacts and receives said piston rod to hydraulically seal said cylinder tube, an upper mount having radial inner and outer elastomeric parts, said inner elastomeric part resiliently connecting said piston rod to said vehicle body, a curved carrier having a body disposed around a portion of said piston rod and a top supported adjacent said radial outer elastomeric part of said upper mount for transmitting suspension loads thereto, an inner rolling lobe air sleeve having one end connected to said support tube and the other end connected to the lower end of said carrier, an outer piston fixed to said support tube, an outer rolling lobe air spring formed by an outer elastomeric sleeve having an upper end connected to said top of said carrier and a lower end connected to said outer piston, said outer piston being a profiled cup extending below said outer rolling lobe air spring and cooperating with said sleeves and said carrier to define a pressurized air chamber pneumatically isolated from said sealing member supported by said cylinder tube and from said upper mount.

2. A suspension strut for operatively mounting a dirigible road wheel assembly to a vehicle body and for pneumatically suspending the body with respect to the road wheel assembly comprising an elongated tubular support tube having one end operatively connected to said road wheel assembly and extending upwardly therefrom, shock absorber means operatively mounted in said support tube including an oil-filled cylinder tube mounted therein, a piston mounted for reciprocal movement in said cylinder tube and having a piston rod extending upwardly therefrom, an upper sealing member in said tube which slidably receives said piston rod and which hydraulically seals said cylinder tube, an upper mount including inner and outer elastomer isolator means connecting said piston rod to said vehicle body, a carrier disposed around a portion of said piston rod and supported by annular bearing means against said outer elastomer isolator means of said upper mount, an inner rolling lobe air sleeve having one end connected to said support tube and the other end connected to the lower end of said carrier, a fixed piston secured to said cylinder tube, a rolling lobe air spring having an upper end connected to said carrier and a lower end connected to said fixed piston to define a pressurized air suspension chamber for transmittal of suspension loads via said annular bearing means and isolated from said seal in said strut and from said annular bearing means and said upper mount.

3. A suspension strut for operatively mounting a dirigible road wheel to support structure of a vehicle body comprising, an upper mount secured to said support structure, said mount having elastomer isolator means and an annular bearing mounted against the lower surface of said isolator means, a support tube operatively connected to said road wheel, a fixed outer piston secured to said support tube, hydraulic damper means disposed in said support tube, said damper means having a cylinder tube with a hydraulic fluid therein, a valved piston mounted for sliding movement in said cylinder tube, a piston rod operatively connected to said piston and extending through said cylinder tube and into operative connection with said elastomer isolator means of said upper mount, air suspension spring means operatively connected to said support tube and mounted against said annular bearing of said upper mount, said air suspension spring means comprising an inner air sleeve retainer having a top mounted against said bearing and a trunk disposed around said piston rod and further comprising inner and outer air sleeve means operatively connected to said air sleeve retainer and said fixed outer piston defining an air chamber pneumatically isolated from said upper mount and said bearing means and isolated from the inner components of said hydraulic damper means to minimize leak paths when said air chamber is supplied with pressurized air to suspend said vehicle body with respect to said dirigible road wheel.

* * * * *